United States Patent [19]

Tucker et al.

[11] Patent Number: 5,452,218
[45] Date of Patent: Sep. 19, 1995

[54] SYSTEM AND METHOD FOR DETERMINING QUALITY ANALYSIS ON FABRICATION AND/OR ASSEMBLY DESIGN USING SHOP CAPABILITY DATA

[75] Inventors: Marvin G. Tucker, Mesquite; Richard W. Johnson, Dallas; Jeffrey T. Brueggeman, Garland; James C. Smyth, Plano; Carol E. Dines, Wylie; Robert S. Hawiszczak, Richardson, all of Tex.

[73] Assignee: Texas Instruments, Dallas, Tex.

[21] Appl. No.: 190,961

[22] Filed: Feb. 3, 1994

[51] Int. Cl.⁶ .................. G06F 17/60; G06F 19/00
[52] U.S. Cl. ..................... 364/468; 364/401; 364/552
[58] Field of Search ............... 364/468, 401, 402, 403, 364/552, 554; 395/919, 903, 904

[56] References Cited

U.S. PATENT DOCUMENTS

| | | | |
|---|---|---|---|
| 4,835,699 | 5/1989 | Mallard | 364/188 X |
| 5,208,765 | 5/1993 | Turnbull | 364/552 |
| 5,245,554 | 9/1993 | Tsuyama et al. | 364/401 |
| 5,321,610 | 6/1994 | Breslin | 364/468 X |
| 5,321,620 | 6/1994 | Tanaka et al. | 395/919 X |

Primary Examiner—Joseph Ruggiero
Attorney, Agent, or Firm—Robert L. Troike; Richard L. Donaldson

[57] ABSTRACT

A system and method for determining quality levels for fabrication and assembly designs using process capabilities stored in a database is disclosed. The capability data is collected and stored in a database accessible to all users. A worksheet is used to model a manufactured product using process capability data retrieved from said database of process capabilities. The system displays the defects and totals them according to a predetermined criteria to produce a measure of quality.

16 Claims, 9 Drawing Sheets

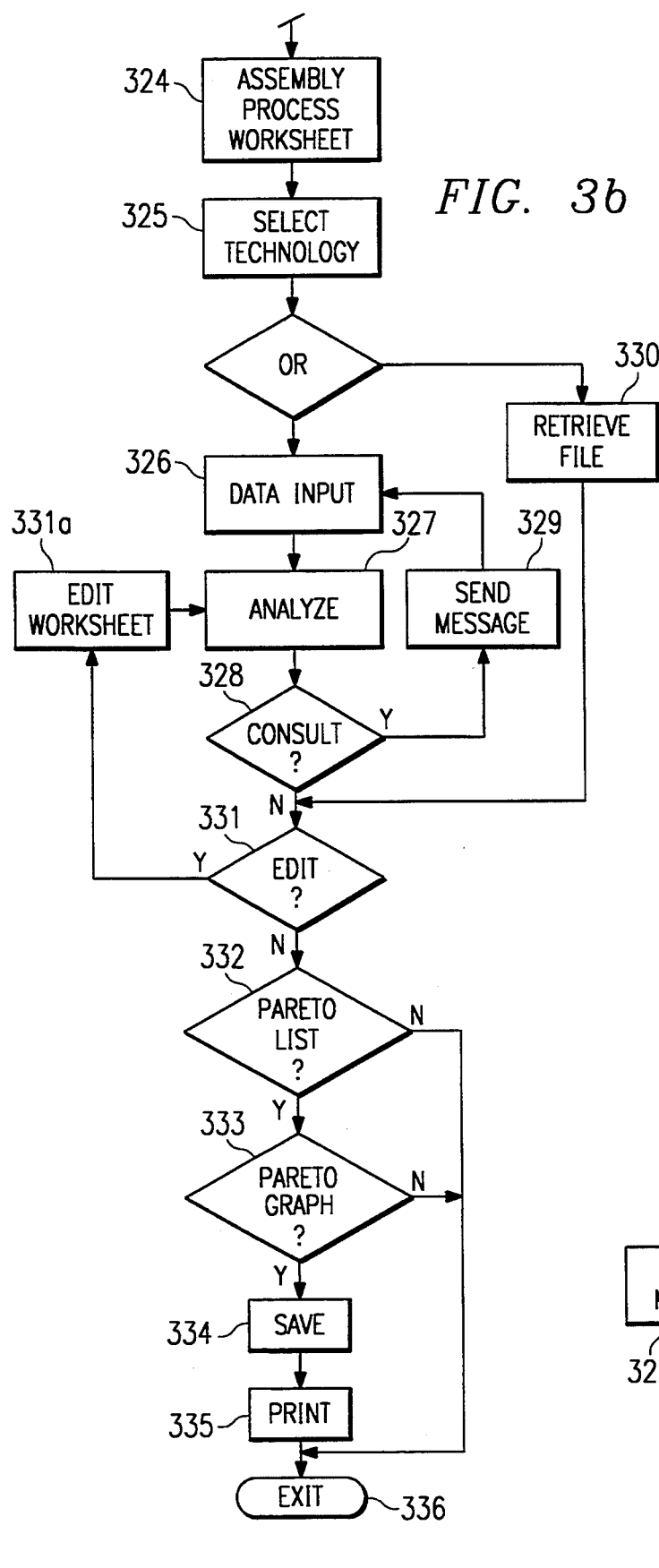

FIG. 5

```
Command ===>
   ESC         PAGE UP          PAGE DOWN              EXIT

ASSEMBLY WORKSHEETS
              ┌─────────────────────────────────┐
              │      CIRCUIT CARD (CCA)         │
              ├─────────────────────────────────┤
              │         MECHANICAL              │
              ├─────────────────────────────────┤
              │          OPTICAL                │
              ├─────────────────────────────────┤
              │        INTERCONNECT             │  ⇐
              ├─────────────────────────────────┤
              │    SURFACE MOUNT TECHNOLOGY     │
              ├─────────────────────────────────┤
              │       FOCAL PLANE ARRAY         │
              ├─────────────────────────────────┤
              │          MICROWAVE              │
              ├─────────────────────────────────┤
              │   SURFACE ACCOUSTICAL WAVE(SAW) │
              └─────────────────────────────────┘

SELECT THE DESIRED WORKSHEET
```

FIG. 5a

```
Command ===>
   ESC ⇐       PAGE UP          PAGE DOWN              EXIT

FABRICATION WORKSHEETS
              ┌─────────────────────────────────┐
              │             METAL               │
              ├─────────────────────────────────┤
              │          NON-METALLIC           │
              ├─────────────────────────────────┤
              │            OPTICS               │
              ├─────────────────────────────────┤
              │         PWB RAW BOARD           │
              ├─────────────────────────────────┤
              │         SMT RAW BOARD           │
              ├─────────────────────────────────┤
              │             GaAs                │
              ├─────────────────────────────────┤
              │             TFN                 │
              └─────────────────────────────────┘

SELECT THE DESIRED WORKSHEET
```

FIG. 6

SAS:AF

Command ===>

COMPLETE HEADER ON WORKSHEET, THEN LIST PROCESSES IN THE SEQUENCE THEY ARE APPLIED USING A "DESCRIPTION" OR THE PROCESS "CODE"

ESC   EDIT   BROWSE   [FILE]   PRINT   VERIFY   ANALYZE   PARETO   CONSULT   HELP   EXIT   CLEAR

MECHANICAL ASSEMBLY PROCESS WORKSHEET

PART NAME: _____ PART NO: _____ REV: _____ NHA PART NO: _____
PERSON PERFORMING ANALYSIS: _____ DATE: _____

| NO | PROCESS DESCRIPTION | TECH CODE | PROCESS CODE | QTY | PROCESS OPPOR | TOTAL OPPOR | DPMO | STD DEV | DPU | A/E | PCL PROCESS DESCRIPTION |
|----|---------------------|-----------|--------------|-----|---------------|-------------|------|---------|-----|-----|------------------------|
| _1 | | | | | | | | | | | |
| _2 | | | | | | | | | | | |
| _3 | | | | | | | | | | | |
| _4 | | | | | | | | | | | |
| _5 | | | | | | | | | | | |
| _6 | | | | | | | | | | | |
| _7 | | | | | | | | | | | |
| _8 | | | | | | | | | | | |
| _9 | | | | | | | | | | | |
| _10 | | | | | | | | | | | |
| _11 | | | | | | | | | | | |
| _12 | | | | | | | | | | | |
| _13 | | | | | | | | | | | |
| _14 | | | | | | | | | | | |
| _15 | | | | | | | | | | | |
| _16 | | | | | | | | | | | |
| _17 | | | | | | | | | | | |

TOTALS

FIG. 6a

SAS:AF

Command ===>
COMPLETE HEADER ON WORKSHEET, THEN LIST PROCESSES IN THE SEQUENCE THEY ARE APPLIED USING A "DESCRIPTION" OR THE PROCESS "CODE"

ESC  EDIT  BROWSE  FILE  PRINT  VERIFY  ANALYZE  PARETO  CONSULT  HELP  EXIT  CLEAR

INTERCONNECT ASSEMBLY PROCESS WORKSHEET
PART NAME: HEAD MIRROR WIRE HARNESS          PART NO:           REV: A           NHA PART NO:
PERSON PERFORMING ANALYSIS: JEFF                                DATE: 5/9/93

| NO | PROCESS DESCRIPTION | TECH CODE | PROCESS CODE | QTY | PROCESS OPPOR | TOTAL OPPOR | DPMO | STD DEV | DPU | A/E | PCL PROCESS DESCRIPTION |
|---|---|---|---|---|---|---|---|---|---|---|---|
| 1 | KIT PARTS | | 7A | 44 | 1 | 44 | 2816 | 0 | 0.124 | A | KIT PARTS |
| 2 | MACHINE STRIP | | 7B | 8 | 2 | 16 | 1000 | 0 | 0.016 | A | MACH STRIP |
| 3 | MACHINE TWIST WIRE SETS | | 7C | 2 | 1 | 2 | 1000 | 0 | 0.002 | A | MACH TW W/S |
| 4 | MANUAL TWIST WIRE SETS | | 7D | 4 | 1 | 4 | 5000 | 0 | 0.020 | A | MAN TW W/S |
| 5 | ROUTE WIRE/CABLE | | 7L | 25 | 2 | 50 | 25000 | 0 | 1.250 | E | ROUTE W/C |
| 7 | CRIMP MANUAL | | 7H | 72 | 3 | 216 | 18667 | 0 | 4.032 | E | CRIMP MAN |
| 8 | CRIMP AUTO | | 7J | 22 | 3 | 66 | 9767 | 0 | 0.645 | A | CRIMP AUTO |
| 9 | ENCAPSULATE W/OUT MOLD | | 7S | 9 | 1 | 9 | 10000 | 0 | 0.090 | A | ENCAP W/O MD |
| 10 | MANUAL SOLDER | | 7E | 121 | 4 | 484 | 100000 | 0 | 48.40 | E | MAN SOLDER |
| 11 | WRAP TERMINATION | | 7G | 14 | 5 | 60 | 2000 | 0 | 0.140 | A | WRAP TERM |
| 12 | SHEILD TERM SOLDER SLEE | | 7N | 25 | 3 | 75 | 6667 | 0 | 0.500 | E | SHLD TERM S/S |
| 13 | SLEEVE CMPT/BUNDLE SHRI | | 7P | 110 | 1 | 110 | 3000 | 0 | 0.330 | E | SLV CMPT/BN SHK |
| 14 | SLEEVE OR TAPE SEGMENT | | 7Q | 2 | 1 | 2 | 5000 | 0 | 0.010 | E | SLV/TAPE SEV |
| 15 | TIEDOWN STRAP/LACING CO | | 7T | 20 | 1 | 20 | 6000 | 0 | 0.120 | E | TDN STP/LAC CD |
| 16 | BAND MARKER TYPE LABEL | | 7W | 1 | 1 | 1 | 1474 | 0 | 0.001 | A | BND MK LBL |
| 17 | MARK REF DES | | 7K | 1 | 1 | 1 | 1474 | 0 | 0.001 | A | MARK RBR ST |
| 18 | MARK MSN | | 7K | 1 | 1 | 1 | 5045 | 0 | 0.005 | A | MARK RBR ST |
| TOTALS | | | | | | 1161 | | | 55.67 | | |

SYSTEM AND METHOD FOR DETERMINING QUALITY ANALYSIS ON FABRICATION AND/OR ASSEMBLY DESIGN USING SHOP CAPABILITY DATA

TECHNICAL FIELD OF THE INVENTION

This invention relates to quality determination analysis and more particularly to quality determination analysis on fabrication and/or assembly designs.

BACKGROUND OF THE INVENTION

It is highly desirable in today's market place to provide higher quality products at lower cost by improving the quality of the fabrication and assembly designs. One such quality measurement has been termed the "six sigma" model for quality. Some view this six sigma measurement in terms of the total number of failures for a given overall fabrication or assembly design and others include every fabrication and assembly feature of that design.

It is highly desirable to provide, during the fabrication or assembly design process, a convenient way of analyzing the results of that design in terms of quality and the results of alternative fabrication or assembly procedures. This will permit the designer to choose those procedures for a given fabrication or assembly design feature that produce the best quality.

SUMMARY OF THE INVENTION

In accordance with one embodiment of the present invention, quality analysis on fabrication and/or assembly designs is achieved using the shop capability data stored in a database.

DESCRIPTION OF THE DRAWING

In the drawing:

FIGS. 3, 3a, 3b and 3c are flow charts of the application program according to one embodiment of the present invention.

FIG. 5 is a screen view of a listing of assembly work sheets.

FIG. 5a is an example of a menu of fabrication worksheets.

FIG. 6 is a screen view of an assembly worksheet menu.

FIG. 6a is a screen view of the assembly worksheet menu with an example.

DESCRIPTION OF PREFERRED EMBODIMENT

Figure 1:
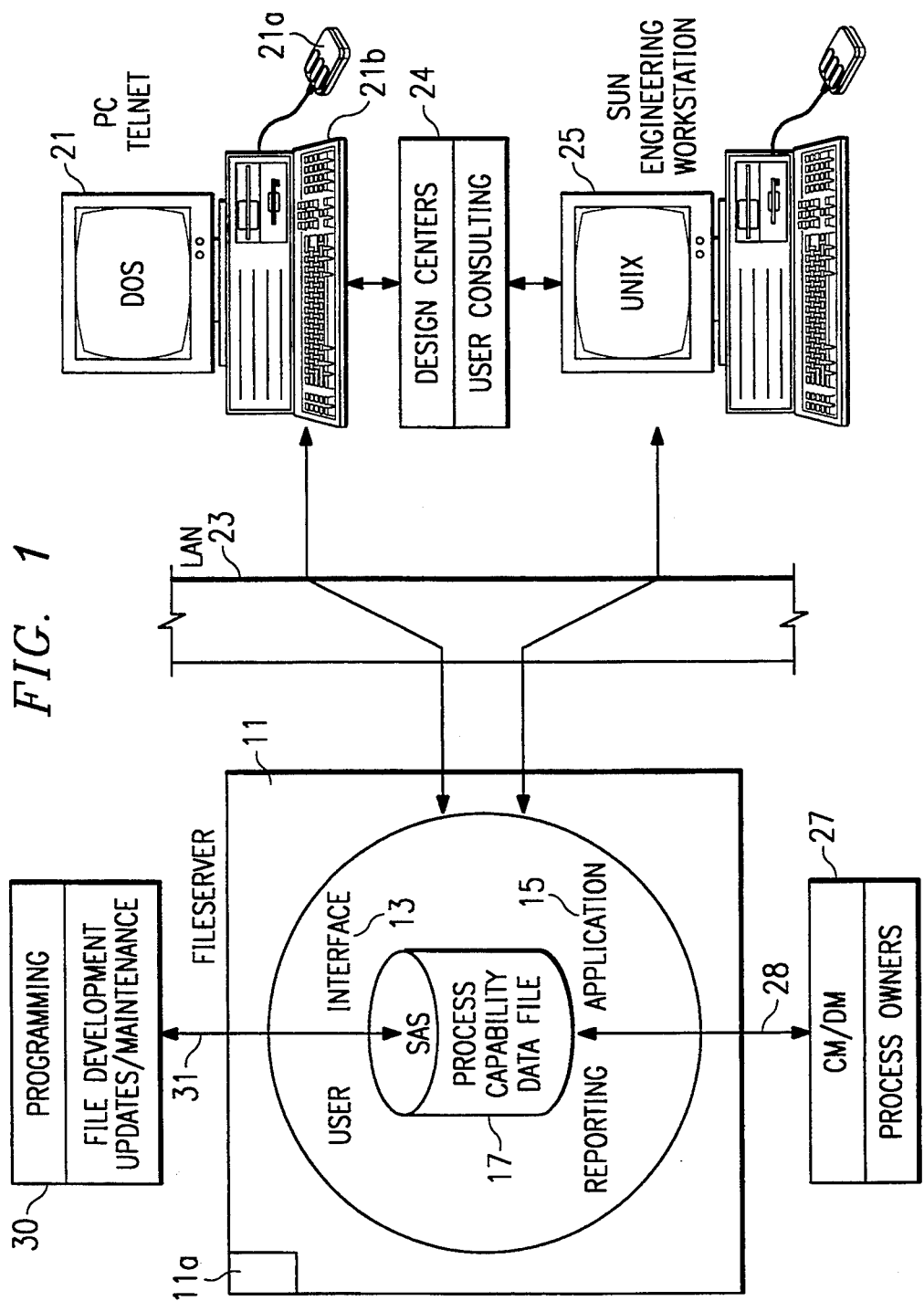
FIG. 1 is a block diagram of the system in accordance with one embodiment of the present invention.

Referring to FIG. 1, there is illustrated the file server 11 which includes therewith user interface layer 13 and application program 15 in addition to the process capability data file 17. A designer at terminal 21 for example, may interface at layer 13 the file server 11 and the application program 15 via LAN network 23. The user at terminal 21 (DOS) or terminal 25 (UNIX) in accordance with the system described may also interface to a design center 24 for user consulting. The process capability data file 17 in server 11 may be improved or altered by the process owners at terminal 27 also coupled to the file server 11 via a coupling means 28. Updating of the process capability data file by programming at system 30 may be also input to the process capability data file 17 of the file server 11 over coupling means 31 as shown in FIG. 1 to update the files, in particular the process capability data file. The file 17 may be a magnetic storage device such as a magnetic disc or tape or a semiconductor storage device such as a ROM, a CD ROM or a RAM.

Figure 2:
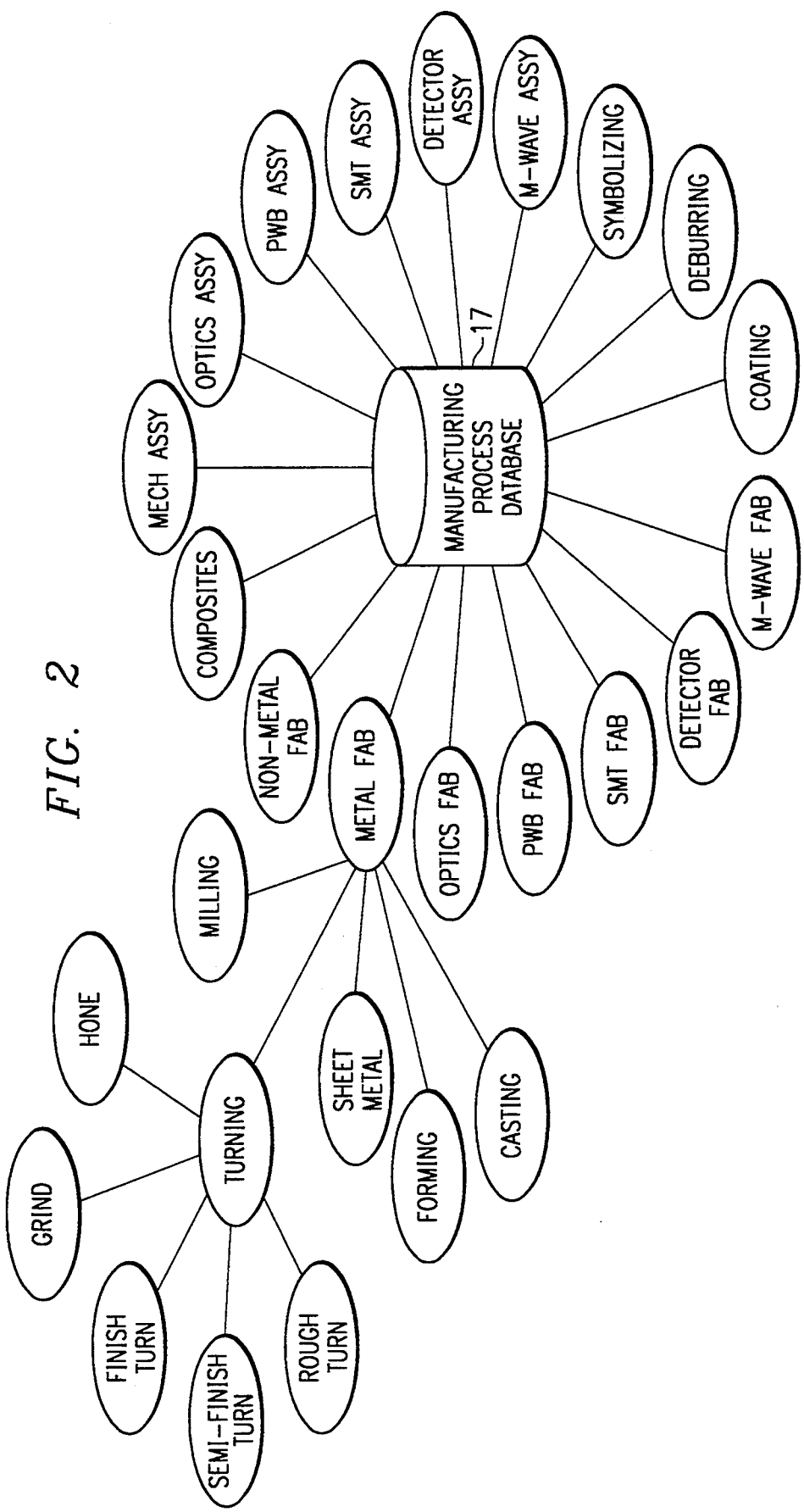
FIG. 2 illustrates the arrangement of a process capability data file in the system of FIG. 1.

FIG. 2 illustrates how the manufacturing process capability data file 17 may be arranged. For example, the process capability file 17 may be comprised of files for mechanical assembly, optics assembly, printed wiring board (PWB) assembly, SMT assembly, detector assembly, microwave assembly, symbolizing, deburring, coating, microwave fabrication, detector fabrication, SMT fabrication, PWB fabrication, optics fabrication, metal fabrication, non-metal fabrication and composites. Each of these files may further have more definition therein such as in the example of metal fabrication may have sub-databases of casting, forming, sheet metal, milling, and turning. The process of turning may further have the sub-database of rough turn, semi finish turn, finish turn, grind and hone. These databases would be updated, corrected, and maintained via the file development updates maintenance by programming as indicated by block 30 of FIG. 1. The names and addresses of process owners will be maintained and provided from block 27.

Figure 3:
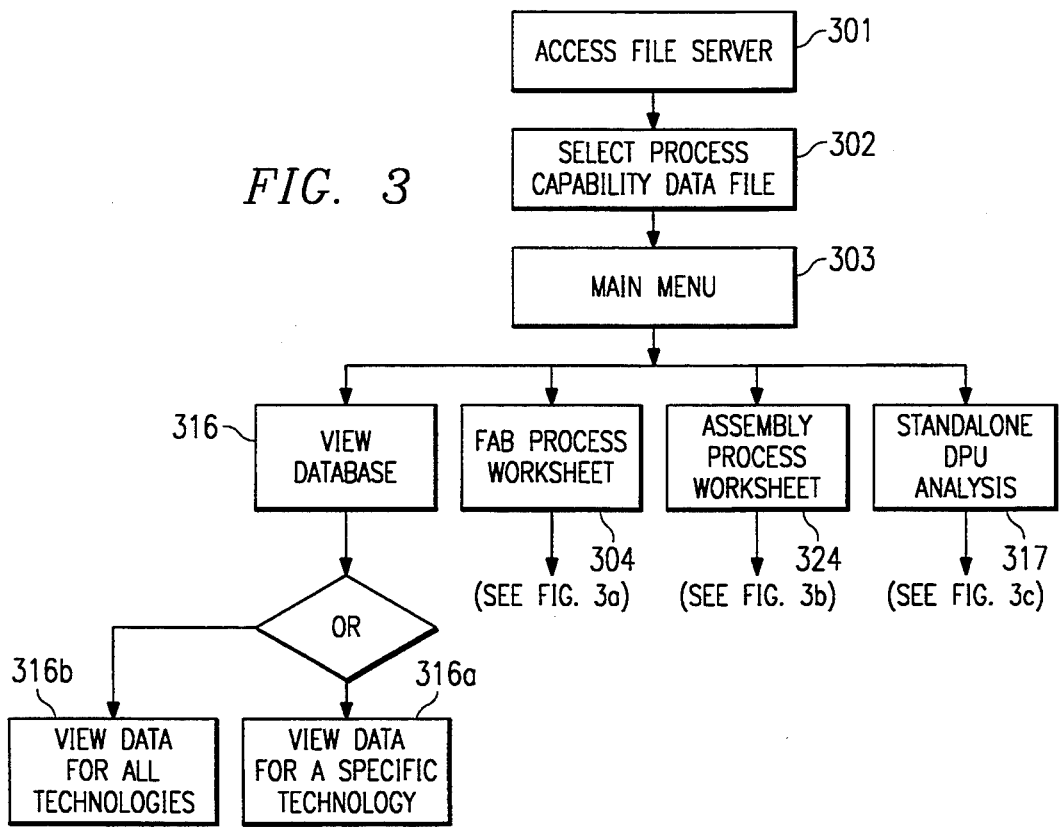
Figure 4:
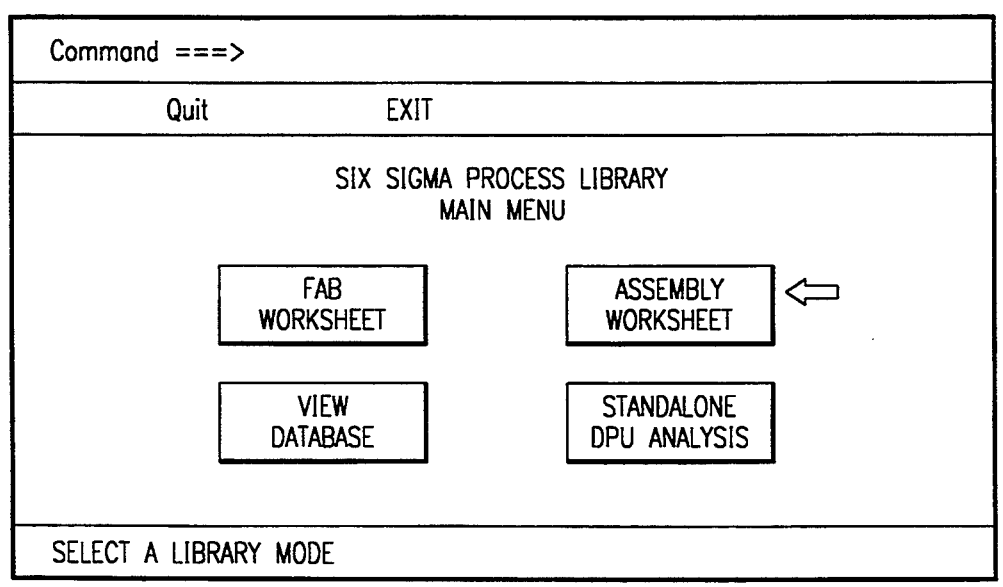
FIG. 4 is a screen view of the main menu.
Figure 3A:
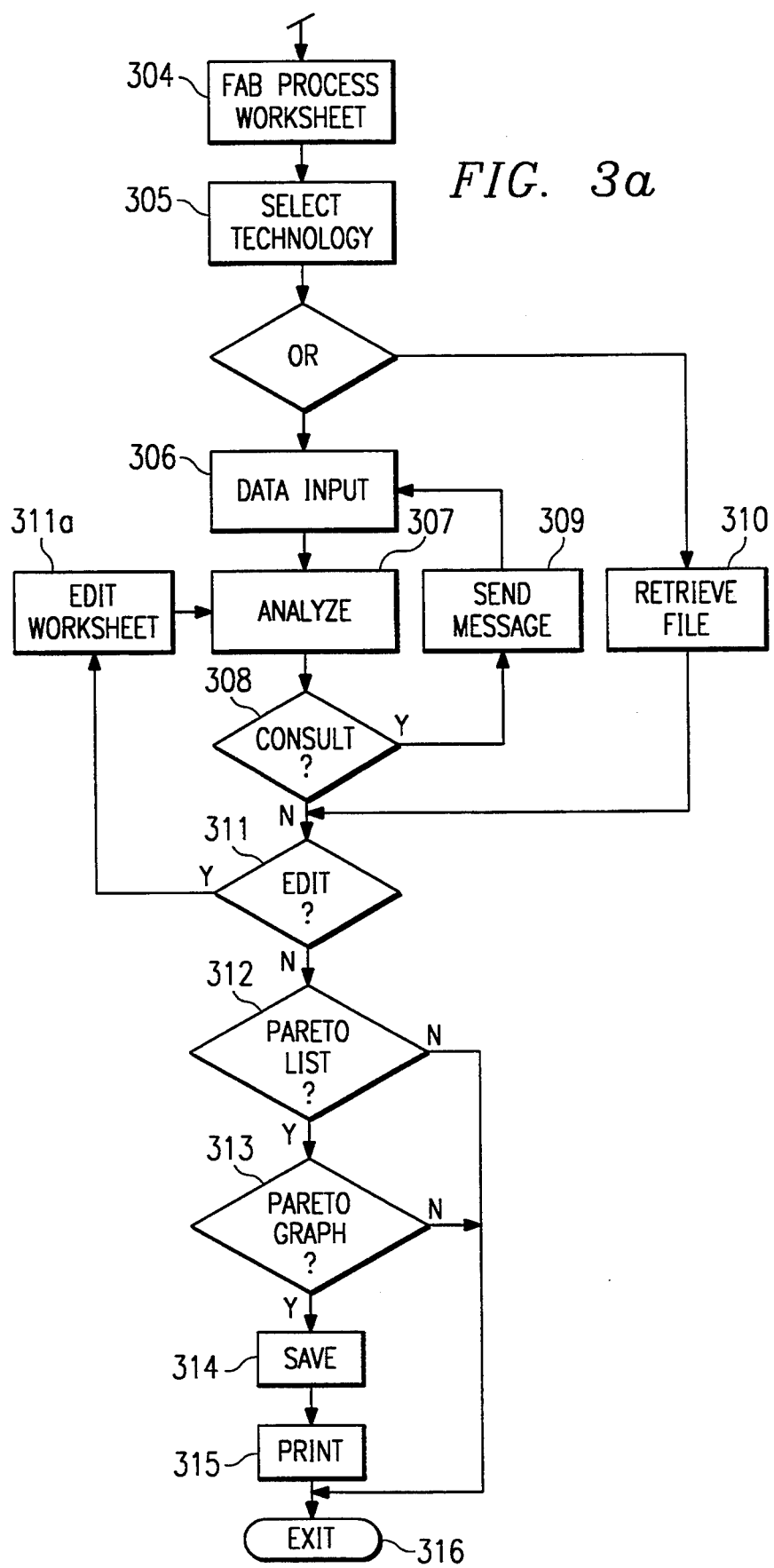

FIGS. 3, 3a, 3b and 3c shows a functional flow chart for the application program 15 in the file server 11 accessed by a user at terminal 21.. File server 11 includes a CPU 11a which runs the application program 15 and accesses the process capability files 17 in accordance with normal computer processing. Referring to FIG. 3, the first Step 301 is to access the file server 11 over the LAN 23. The second Step 302 is to select the process capability data file 17 in the file server 11 and the application 15. The application 15 will present to the user at terminal 21 the question in Step 303 whether to view the database or to call up a worksheet for fabrication, a worksheet for assembly, or select the stand alone DPU analysis. A typical screen is shown in FIG. 4 At this point, selection of either the Fab Worksheet or Assembly Worksheet will invoke identical worksheet formats and analysis functions with the only differences being in the worksheet headings which indicate either a Fab (fabrication) worksheet (Step 304) or Assembly worksheet (Step 324). If the worksheet for assembly is selected in Step 324, a technology must then be selected from the list of technologies mentioned previously. That selection would take place in Step 325 and follows diagram of FIG. 3b. An example of a menu of assembly worksheets is shown in FIG. 5 and an example of a menu of fabrication worksheets is shown in FIG. 5a. Interconnect, for example, is selected in the menu of FIG. 5. For a given technology, a worksheet form on the CPU screen is provided from the process capability data file 17 in Step 326. Assume, for example, a Mechanical Assembly worksheet is selected in Step 326. In Step 326 a standard worksheet format will be displayed with the title in the worksheet heading indicating, for example, "Mechanical Assembly Process Worksheet." FIG. 6 is a blank mechanical assembly worksheet and FIG. 6a is an example of a filled in mechanical assembly process worksheet. A similar worksheet would be called up for a selected fabrication worksheet such as metal. The user after calling up the worksheet can place a cursor on a button or area and "enter" or a selection arrow using a mouse and click on the button on area to edit, browse, file, print, verify, analyze, pareto, consult, get help, etc. A file is retrieved via steps 310 or 330 which can be edited via steps 331,331a or 311 and 311a. The worksheet is analyzed in Steps 307 and 327. The analyzed step 307,327 follows the flow chart of FIG. 7. In the first step 701 of FIG. 7, the design engineer is presented a screen that notifies that he is in a particular technology and given a listing of selectable processes and subprocesses in that technology from process capability data file 17. The design engineer once he has selected the process and subprocess is also notified of is given a listing of parameters. When sufficient parameters are provided, the system as indicated in Step 702 pulls out from the data file 17 the process mean standard deviation or DPMO, opportunity count, distribution code, short/long term indicator, actual or estimate capability for the process under analysis. From that information, if the DPMO is presented the DPU is calculated in Step 703 and if standard deviation DPU is calculated by Step 704 to present that data on a screen shown in 705. This screen summarizes a description trail and calculated information along with pertinent process information. This data is then put on the appropriate row and column of the associated process. Once this is done for all rows, all processes are then totalled for the total opportunity and total DPU. If a consultant is requested, a message is sent via Step 309 or 329. A pareto listing of the file is made in steps 312, 313, 332 and 333. The worksheet format is divided vertically into seven sections indicated at the left in FIG. 6:

| SECTION | DESCRIPTION |
| --- | --- |
| 1 | "Command Line" - Allows user to manually type worksheet commands as opposed to invoking commands using "buttons" in "Function Menu Line" (Section 3, described below). |
| 2 | "Information Line" - Automatically displays user instructions for the current worksheet function mode. |
| 3 | "Function Menu Line" - Contains function "buttons" for invoking worksheet generation functions by placing cursor on button and pressing "enter" or clicking mouse button (Button functions described below). |
| 4 | "Worksheet Heading" - Displays worksheet type and supplies input addresses for name of part being analyzed, part number, revision letter, next higher assembly part number, person performing analysis, and date. |
| 5 | "Column Headings" for analysis data inputs and calculation fields (Column titles and definitions discussed below). |
| 6 | "Analysis Field" - Columns for analysis data inputs and calculation fields (Input procedure described below). |
| 7 | "Totals Line" - Summation totals for "Total Oppor" and "DPU" columns. |

| BUTTON | FUNCTION DESCRIPTION |
| --- | --- |
| ESC (ESCAPE) - | Returns monitor display to prior screen. |
| EDIT - | Invokes an input window with instructions and function buttons allowing user to INSERT, DELETE, or MOVE single or multiple process data lines in the analysis field of the worksheet (Steps 311 & 331). |
| BROWSE - | Invokes a window with instructions and function buttons allowing user to view process data recorded in the process capability data file 17 (Step 316). |
| FILE - | Invokes a window with instructions and function buttons allowing user to RETRIEVE an existing file or SAVE the current file (Steps 310, 330, 314, & 334). |
| PRINT - | Invokes a window with instructions and function buttons allowing user to PRINT the current file at a designated PRINTER LOCATION (Steps 315 & 335). |
| VERIFY - | After "highlighting" a single process description in the "Process Description" column for a process line, for which the appropriate data has been input and a DPU calculated and displayed), selection of the VERIFY function invokes a window with a complete process description and data listing for the highlighted process. |
| ANALYZE - | After entering a process description in the "Process Description" column and highlighting that description, selection of the ANALYZE function invokes a series of windows with instructions and function buttons allowing the user to input sufficient process description information for determining the "process capability" for the process described (stated as a "dpmo" or "standard deviation") (Steps 307, 320, & 327). See flow chart of FIG. 7. |
| PARETO - | Invokes a window with a PARETO listing of all process lines in the analysis field listed in descending order based on the value of the calculated DPU for each process. The window also includes GRAPH and PRINT function buttons allowing the user to view a GRAPHICAL representation of the PARETO listing and to PRINT the PARETO listing or GRAPH (Steps 312, 313, 332, & 333). |
| CONSULT - | Invokes a window with instructions and function buttons allowing the user to send a PROCESS CONSULTANT a request for information about a process not found in the Process Capability Data File 17. The request is communicated to the PROCESS CONSULTANT via "E-Mail" (Electronic Mail) or "msg" (electronic message) invoked within the CONSULT window (Steps 308, 321, & 328). |
| HELP - | Invokes a window with definitions of the different function options available on the current screen and information about how to perform the worksheet analysis steps involved in the current worksheet function mode. |
| EXIT - | Exits the user from the current worksheet function screen to the Main Menu for the Process Capability Library (Steps 316 & 336). |
| CLEAR - | After highlighting selected fields in the worksheet, selection of the CLEAR function button clears the indicated field(s) of any existing data. |

The worksheet column titles found in section 5 of the worksheet format discussed above, along with a description of each column follow:

| COLUMN TITLE | COLUMN DESCRIPTION |
| --- | --- |
| NO | (NUMBER) - Line number indicator. |
| PROCESS DESCRIPTION | A brief description of a process (Fabrication or Assembly) input by the user. |
| TECH CODE | (TECHNOLOGY CODE) - A code of alpha characters indicating the manufacturing technology category in which the associated process (listed in the "Process Description" column) is found. The TECH CODE is automatically entered with the default code being the code associated with the technology associated with the worksheet type for the current worksheet. |
| PROCESS | An alpha-numerical code assigned to indivi- |

-continued

| COLUMN TITLE | COLUMN DESCRIPTION |
|---|---|
| CODE | dual processes either retrieved by the embedded analysis algorithms during the ANALYZE function or input by the user. |
| QTY | (QUANTITY) The number of times the associated process (listed in the "Process Description" column) is applied in the fabricated part or assembly being analyzed - input by the user. |
| PROCESS OPPOR | (PROCESS OPPORTUNITIES) The number of opportunities for a defect to occur in one application of the associated process (listed in the "Process Description" column) - input by the user. |
| TOTAL OPPOR | (TOTAL OPPORTUNITIES) - The total number of opportunities for a defect to occur in the number of applications of the associated process (listed in the "Process Description" column) indicated in the QTY column (TOTAL OPPOR = (QTY) × (PROCESS OPPOR)). |
| DPMO | (DEFECTS PER MILLION OPPORTUNITIES) - The "process Capability" for the associated process (Listed in the "Process Description" column) retrieved by the embedded analysis algorithms during the ANALYZE function. |
| STD DEV | (STANDARD DEVIATION) - The "process Capability" for the associated process (Listed in the "Process Description" column) retrieved by the embedded analysis algorithms during the ANALYZE function. |
| DPU | (DEFECTS PER UNIT) - Number of defects expected to occur with the indicated number of applications (indicated in the QTY column) of the associated process (Listed in the "Process Description" column) - Automatically calculated by the embedded analysis algorithms during the ANALYZE function. Operation is shown and discussed above in connection with FIG. 7. |
| A/E | (ACTUAL OR ESTIMATE) - Indication of whether the retrieved "Process Capability" (in the DPMO or STD DEV column) is derived from actual production data or is an estimate of the capability for the process. |
| PCL PROCESS DESCRIPTION | A standard description embedded in the Process Capability Data File 17 for the associated process (Listed in the "Process Description" column). |

Figure 7:
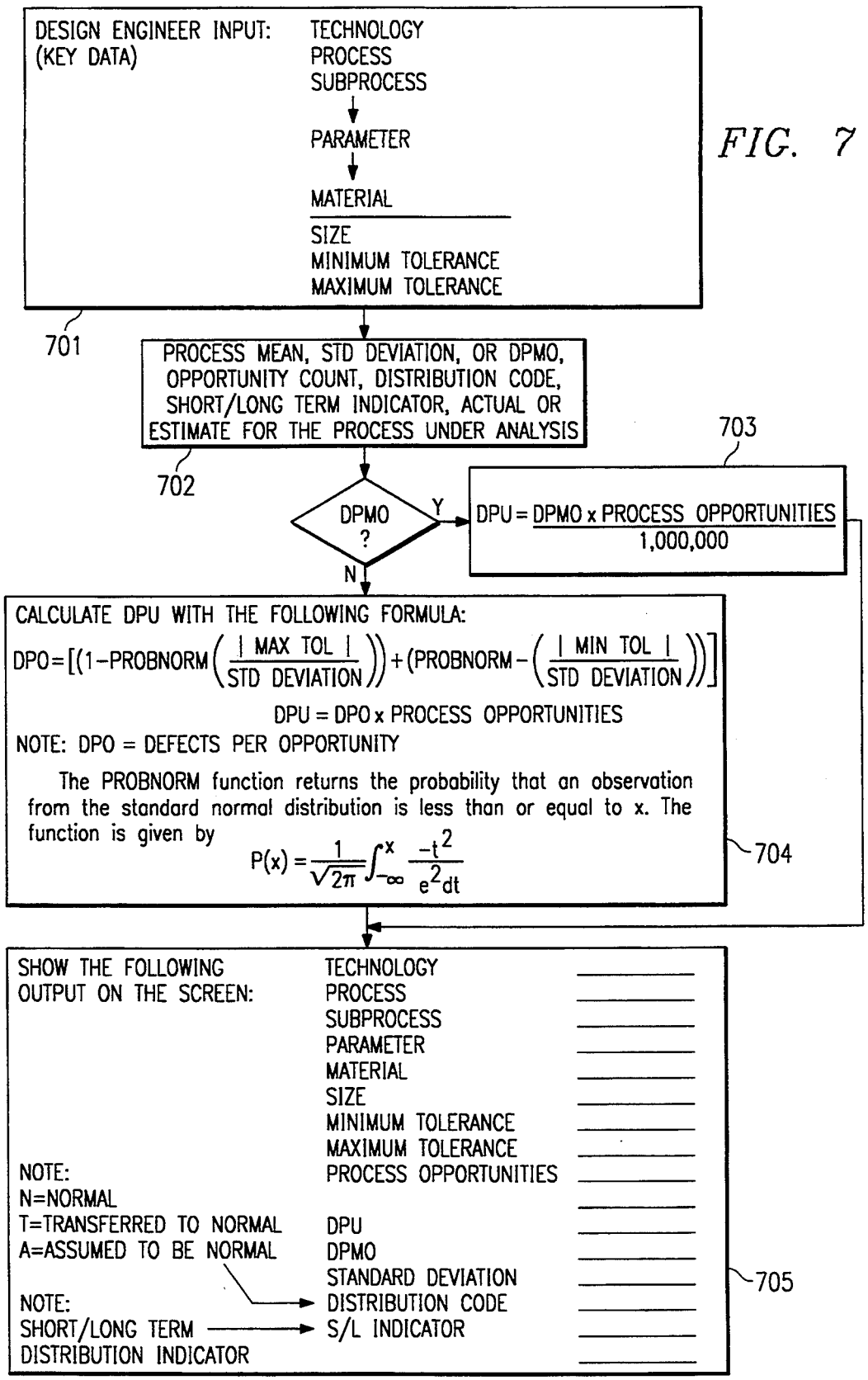
FIG. 7 is a flow chart of the analyzer subroutine of FIG. 3a and 3b.

The input procedure for the "Analysis Field" in Section 6, described above, follows:

1. After entering the required information in the "Heading" section of the worksheet, the user will list the Fabrication and/or Assembly processes required to manufacture the unit being analyzed (preferably in the proper sequential order). The "technology code" for each process is automatically displayed in their respective data fields in the TECH CODE column.
2. The user enters the number of applications of each process in their respective fields in the QTY column.
3. The user will "highlight" the process description on line number I and either enter the process code (if known) or select the ANALYZE function button.
4. The user follows the instructions for using the functions while in the ANALYZE mode to supply detailed descriptions of all processes listed in the "Process Description" column beginning with line number 1 for automatic retrieval of process capability data from the Process Capability Data File 17. As the process capability data is retrieved for the process, the process capability data is automatically entered into it's respective data field in the worksheet (whether a DPMO or a STD DEV); the process code is automatically entered for the process in it's respective data field in the PROCESS CODE column; the process opportunity count for the process is automatically retrieved from the Process Capability Data File 17 and entered into it's respective data field in the PROCESS OPPOR column; the total number of opportunities associated with the process is automatically calculated and entered in it's respective data field in the TOTAL OPPOR column; the DPU for the process is automatically calculated and entered in it's respective data field in the DPU column; an "A" (ACTUAL) or "E" (ESTIMATE) is automatically retrieved from the Process Capability Data File 17 and entered in it's respective data field in the A/E column; and the PCL PROCESS DESCRIPTION is automatically retrieved form the Process Capability Data File 17 and entered into it's respective data field in the PCL PROCESS DESCRIPTION column. The flow chart for steps taken while in ANALYZE mode is shown in FIG. 7.

5. Steps 2 & 3 are repeated until all processes listed have data in their respective DPMO or STD DEV columns.

If the VIEW DATABASE function is selected at Step 303, Step 316 would allow the user to select a particular technology area (Step 316a) of the Process Capability Data File 17 for viewing or to select the entire Capability Data File 17 in all technology areas in Step 316b for viewing.

If the STANDALONE DPU ANALYSIS function is selected at Step 303, Step 317 would allow the user to perform a DPU analysis on a single process by selecting the appropriate technology area in Step 318, entering the detailed process description through selection of process descriptors from the Process Capability Data File 17 and entering the number of applications for the process in Step 319. Completion of data entry invokes a window with the calculated total opportunity count and calculated DPU for the process in step 320. If the requested data is not found in the Process Capability Data File 17, the user may choose to select the CONSULT button function to invoke the input screen for Process Consulting help. Selecting the CONSULT button (Step 321) will invoke a screen with instructions and function buttons for sending a message to an appropriate consultant (Step 322) requesting the desired process capability data.

In accordance with the system as described above, a design engineer is allowed to predict the number of types of defects that are expected to occur during production of the product(s) analyzed using this system. This system uses established statistical mathematical concepts and measured manufacturing process capability data stored in a Process Capability Data File 17 to perform DPU predictions for each manufacturing process used. The design engineer is also allowed to use the embedded Pareto analysis functions to facilitate evaluation of alternative designs before actual manufacturing occurs.

What is claimed is:

1. A method of predicting production defects per unit of a product comprising the steps of:
   storing manufacturing process capability data in a database in terms of product defects, generating a model for the manufacture of said product, and combining said manufacturing process capability data with said model for manufacture to predict the production defects per unit of said model of said product.

2. The method of claim 1 wherein said storing step includes storing a plurality of technologies.

3. The method of claim 1 wherein said storing step includes storing for any manufacturing technology, a worksheet containing provision for editing said worksheet for modeling and refining of the manufacture of a proposed product using a plurality of manufacturing processes and their associated capability data.

4. The method of claim 3 wherein said combining step includes summing the defects per unit on said worksheet for the generated model.

5. The method of claim 1 wherein said storing step includes storing defects in terms of DPMO.

6. The method of claim 1 wherein said storing step includes storing defects in terms of standard deviations.

7. A method of determining the expected quality of a product comprising the steps of:

storing shop capability data in a database in terms of product defects and operations, selecting the data associated with the process of making the product, and combining the defects and operations elected in making the product to determine the expected quality of the product, said storing step includes storing a plurality of technologies, and said storing step includes storing for each technology a worksheet containing provisions for one or more lines of processes with process lines having process opportunities, DPMO, and standard deviations.

8. The method of claim 7 wherein said selecting step includes editing the lines in said worksheet as determined by the product.

9. The method of claim 8 wherein said combining step comprises determining the DPU for each line, totaling the DPUs by adding the DPUs on the worksheet and multiplying the process opportunities by the quantity of applications to get the total opportunities.

10. The method of claim 9 wherein the combining step further includes the step of assessing a quality level based on opportunities and total DPUs.

11. A method of determining the expected quality of a product before producing the product comprising the steps of: storing a database of shop capability data in terms of operation steps, process opportunities, and DPMO; generating a worksheet of shop capability data by adding and subtracting data using an edit function; and adding the DPMOs on the worksheet and calculating a process DPU.

12. The method of claim 11 further including the step of storing a process capability value based on a DPMO and getting a process capability value based on said DPMO.

13. An apparatus for predicting the production defects per unit of a product comprising:

a database comprising manufacturing process capability data in terms of product defects, selection circuitry for retrieving process capability data associated with any specific manufacturing process included in a selected model for manufacturing of said product, and combining circuitry for predicting the production defects per unit of said selected model of said product.

14. The apparatus of claim 13 wherein said database includes standard deviation.

15. The operator of claim 13 wherein said database includes DPMO.

16. A method of designing a product comprising the steps of:

(a) storing manufacturing process capability data in a database in terms of product defects, (b) generating a model for the manufacture of said product, (c) combining said manufacturing process capability data with said model for manufacture to predict the production defects per unit of said model of said product, and (d) repeating steps (a) through (c) until said model has least defects per unit.

* * * * *